US008423009B2

(12) United States Patent
Srinivasan et al.

(10) Patent No.: US 8,423,009 B2
(45) Date of Patent: Apr. 16, 2013

(54) AUTOMATED DELIVERY OF FLIGHT DATA TO AIRCRAFT COCKPIT DEVICES

(75) Inventors: Thiru Srinivasan, Highlands Ranch, CO (US); Dan McGaw, Highlands Ranch, CO (US); Scott Reagan, Littleton, CO (US); Mike Abbott, Littleton, CO (US)

(73) Assignee: The Boeing Company, Chicago, IL (US)

( * ) Notice: Subject to any disclaimer, the term of this patent is extended or adjusted under 35 U.S.C. 154(b) by 1509 days.

(21) Appl. No.: 11/433,719

(22) Filed: May 12, 2006

(65) Prior Publication Data

US 2007/0264953 A1    Nov. 15, 2007

(51) Int. Cl.
*H04B 7/00* (2006.01)
*H04M 3/00* (2006.01)
*G06F 7/00* (2006.01)
*G06F 17/00* (2006.01)

(52) U.S. Cl.
USPC .............................. 455/419; 455/66.1; 701/3

(58) Field of Classification Search ...................... 701/3; 455/418–420, 66.1
See application file for complete search history.

(56) References Cited

U.S. PATENT DOCUMENTS

| 5,951,620 | A | * | 9/1999 | Ahrens et al. ................ 701/200 |
| 6,047,165 | A | * | 4/2000 | Wright et al. ................ 455/66.1 |
| 6,173,159 | B1 | | 1/2001 | Wright et al. |
| 6,438,468 | B1 | | 8/2002 | Muxlow et al. |
| 6,606,544 | B2 | | 8/2003 | Glenn, III et al. |
| 6,671,589 | B2 | * | 12/2003 | Holst et al. ........................ 701/3 |
| 6,915,189 | B2 | * | 7/2005 | Igloi et al. ........................ 701/14 |
| 7,356,389 | B2 | * | 4/2008 | Holst et al. ........................ 701/3 |
| 2003/0003872 | A1 | * | 1/2003 | Brinkley et al. ................ 455/66 |
| 2003/0051170 | A1 | * | 3/2003 | Spearman ..................... 713/201 |
| 2003/0069015 | A1 | * | 4/2003 | Brinkley et al. .............. 455/431 |
| 2005/0228559 | A1 | * | 10/2005 | Bloch et al. ...................... 701/33 |
| 2005/0288831 | A1 | | 12/2005 | Lusardi et al. |
| 2007/0136078 | A1 | * | 6/2007 | Plante .............................. 705/1 |

OTHER PUBLICATIONS

European Search Report ref: 1284P291EP MW n.

* cited by examiner

*Primary Examiner* — Matthew Sams
(74) *Attorney, Agent, or Firm* — Parsons Behle & Latimer

(57) ABSTRACT

Flight data and information update files such as electronic charts used by aircraft cockpit devices are automatically installed by a secure, wireless delivery system. A service provider downloads file updates through the Internet to servers at airport locations, within wireless transmission range of aircraft on the ground. A secure wireless link and router transmits the file updates from the server directly to a router on board the aircraft which routes the files to cockpit devices onboard the aircraft. Authentication procedures are used to assure that the cockpit device is authorized to receive the update. The servers are also connected to airport kiosks, where pilots may download the updates onto a media storage device, such as a flash memory card that can be used by the pilots to manually install the updates in the cockpit devices.

9 Claims, 2 Drawing Sheets

AUTOMATED DELIVERY OF FLIGHT DATA TO AIRCRAFT COCKPIT DEVICES

FIELD OF THE INVENTION

This invention generally relates to techniques used to install and update information such as charts and navigational aids in various aircraft cockpit devices, and deals more particularly with a system for delivering and installing these information updates wirelessly and automatically.

BACKGROUND OF THE INVENTION

Various electronic instruments and devices used in commercial aircraft, particularly in the cockpit, contain stored information that must be periodically updated. Examples of such information include navigational charts, navdata files and notices to airmen (NOTAMs). Airline operators normally subscribe to update services that make update files available to pilots. Pilots are required to know when a subscription to a navigational chart or navdata is out of date. In order to update information in a cockpit device, the pilot must establish a connection with the update service provider using a personal computer or specialized equipment, and download the updates onto portable media such as a flash memory card, USB memory key, PCMCIA card, or CD. This procedure is performed off-board the aircraft, such as in a pilot service area in an airport terminal, where the pilot can access the service provider via the internet. After downloading the updates onto the media, the pilot must then insert the media card directly into the device or into a reader in the cockpit which routes the information to the appropriate cockpit device via a LAN (Local Area Network). A number of steps must therefore be manually performed by the pilot in order to install information updates in cockpit devices. In the event the media is defective or an error is made during the download or installation steps, the pilot must call ground-based customer service representatives to assist in reprogramming of the media.

From the foregoing, it can be appreciated that the process of installing information updates in cockpit devices is time consuming, requires substantial pilot attention and can be subject to error. Accordingly, there is a need in the art for a system for automatically delivering information updates to cockpit devices which eliminates the problems of the prior art discussed above. The present invention is directed towards satisfying this need.

SUMMARY OF THE INVENTION

According to one aspect of the invention, a method is provided for automatically delivering electronic files to cockpit devices onboard an aircraft. The method comprises the steps of: storing at least one electronic file in a ground-based storage location; detecting when an aircraft comes within a predetermined distance of a wireless transmitter; reading the electronic file from the server when the aircraft is detected; transmitting the electronic file from the wireless transmitter to the detected aircraft; and, installing the electronic file in a cockpit device on the aircraft.

In accordance with another aspect of the invention, a method is provided for delivering electronic files to devices on-board an aircraft, comprising the steps of: storing a plurality of electronic files at a central location; transmitting the electronic files from the central location to each of a plurality of file distribution sites respectively associated with aircraft landing areas; storing the transmitted electronic files at the respective distribution sites; reading the stored files; wirelessly transmitting the electronic files from each of the distribution sites to aircraft within the landing areas respectively associated with the distribution sites; receiving the wirelessly transmitted electronic files at the aircraft; and, installing the electronic files in the devices on-board the aircraft.

In accordance with still another aspect of the invention, a method is provided for automatically delivering electronic file updates to cockpit devices onboard aircraft, comprising the steps of: storing electronic file updates at a storage location near an aircraft landing area; verifying that at least one device onboard an aircraft in the landing area is authorized to receive an electronic file update; wirelessly transmitting an electronic file update to an aircraft having the device authorized to receive the update; and, installing the electronic file update in the device.

According to still another aspect of the invention, a method is provided for delivering electronic file updates used in cockpit devices onboard aircraft, comprising the steps of: storing electronic file updates at a central location; downloading the electronic file updates to each of a plurality of distribution sites; storing the electronic file updates at the distribution sites; providing information at the distribution sites that identifies the cockpit devices on-board aircraft in landing areas respectively associated with the distribution sites; reading stored file updates; and, transferring the file updates to the cockpit devices.

According to a further aspect of the invention, a system is provided for automatically delivering electronic files to cockpit devices onboard aircraft. The system comprises a ground-based computer for storing the electronic files; a wireless communication network established between the computer and an aircraft when the aircraft enters a predetermined area on the ground, the communication network being operable for automatically transmitting electronic files stored on the server to the aircraft when the aircraft enters the predetermined area; and, a router onboard the aircraft for routing the electronic files received from the computer to the cockpit devices.

An important feature of the invention resides in the ability of the system to automatically transfer information updates in real-time and on-demand from storage locations directly to aircraft cockpit devices without the need for human intervention. Another feature of the invention is that the information updates are installed in the cockpit devices by wireless communication links that are secure. Authentication procedures are used to verify that a particular cockpit device is authorized to receive an information update.

Various additional objects, features and advantages of the present invention can be more fully appreciated with reference to the detailed description and accompanying drawings that follow.

DETAILED DESCRIPTION OF THE PREFERRED EMBODIMENTS

Figure 1:
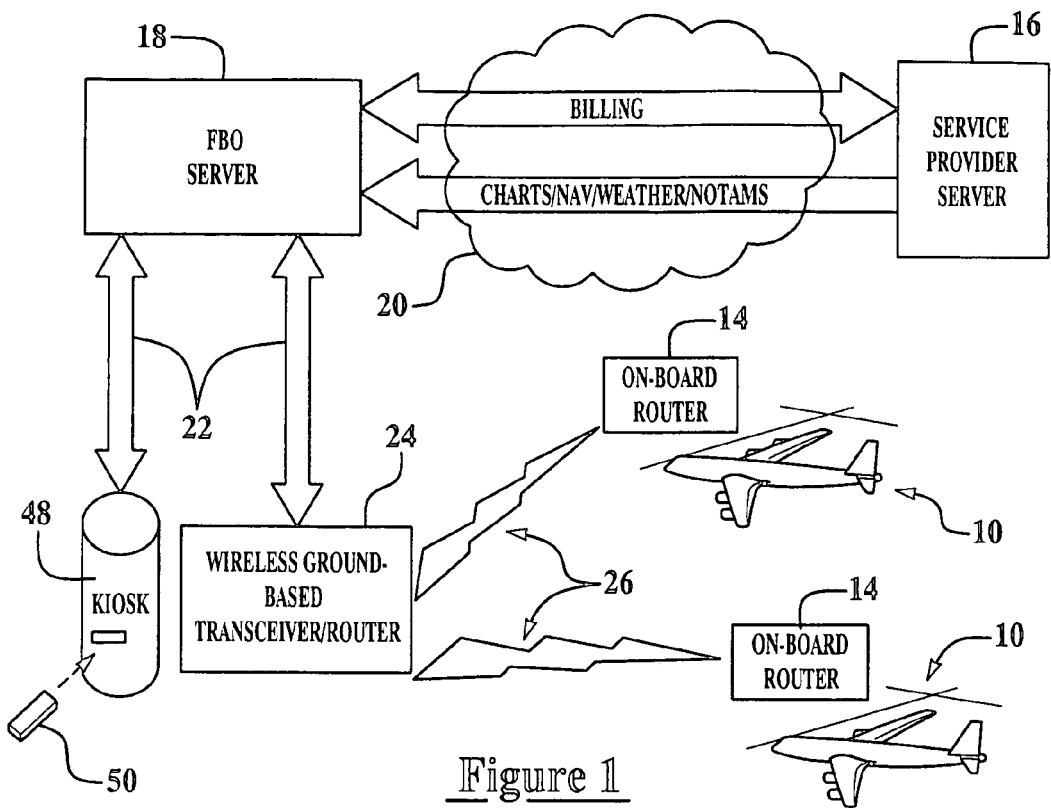
FIG. 1 is an overall block diagram of a system for automatically delivering information updates to aircraft cockpit devices, in accordance with one embodiment of the invention.
Figure 2:
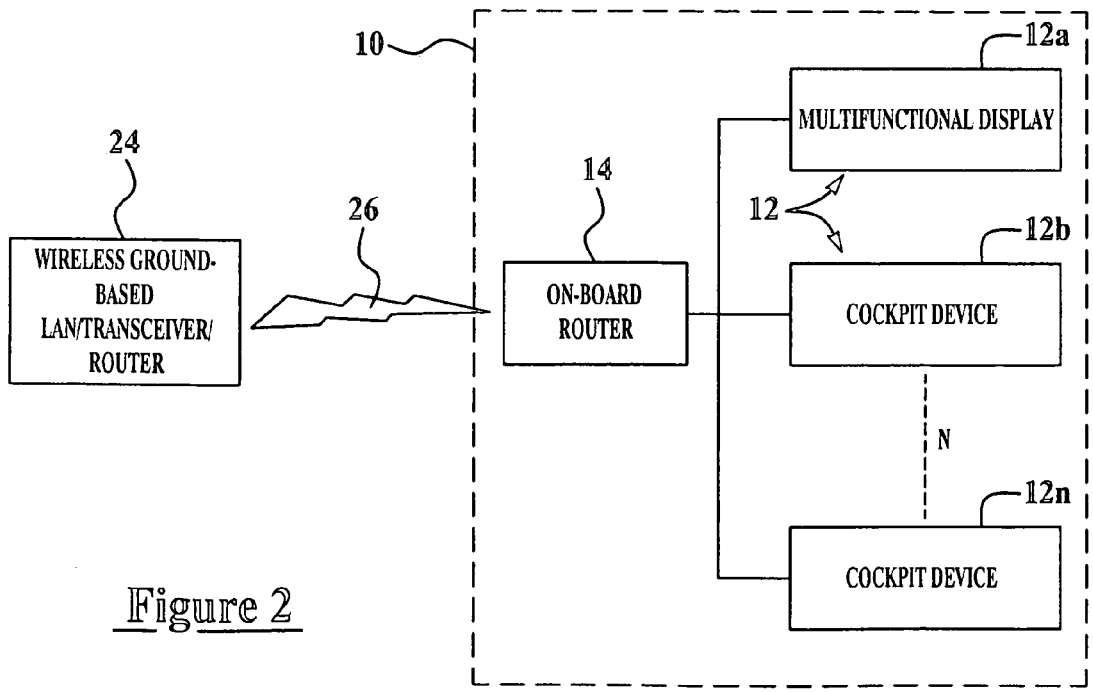
FIG. 2 is a block diagram showing how the information updates are routed to cockpit devices onboard the aircraft.

Referring first to FIGS. 1 and 2, commercial aircraft 10 employ numerous electronic instruments and devices 12 in their cockpits that require periodic update of stored data or information such as charts, NAVDATA and NOTAMs used by the devices to aid in piloting the aircraft. This information is typically in the form of various types of electronic files comprising either text, data, audio, graphics, or a combinations of these file types. In some cases, the information updates consist only of information which is new or different from the information already stored in the cockpit device, whereas in other cases the information update may comprise an entire replacement file. In the illustrated embodiment, the devices include a multifunctional display 12a, and an array of other devices 12b-12n connected in a LAN with a router 14 whose details will be discussed later.

The information updates are generated by a service provider who stores all versions of the update files on a central server 16 that is typically resident in the service provider's premises and serves subscribers over a wide geographic area. The service provider server 16 tracks all changes and revisions in the files so that the service provider always knows which updates are the most current. In addition, the server 16 maintains a list of subscribers to information updates, which includes identification of the specific cockpit devices 12 that have subscribed to the information update service. This information typically will include a device ID number such as a serial number, name of the aircraft operator, the tail number of the aircraft in which the device 12 is installed, and other similar information that enables the service provider 16 to control the delivery of information updates so that they are only installed in cockpit devices 12 that are authorized to receive the updates.

The service provider 16 periodically delivers update files, as they become available, to a plurality of storage locations which serve as distribution sites. For sake of simplicity, only one of these storage locations is shown in FIG. 1, comprising a server 18 operated by a Fixed Base Operator (FBO). In the preferred embodiment, the update files are delivered from the service provider server 16 to the FBO server 18 via the internet 20. To conserve bandwidth, the files may be downloaded from the server 16 to server 18 during off-hours when internet traffic is reduced. FBOs typically provide a number of services to commercial aircraft operators in or nearby airports or other landing areas, where the aircraft receive some type of ground service.

Each of the FBO servers 18 possesses a unique IP address so that the service provider server 16 knows to which FBO server 18 a particular file is being sent. Each of the FBO servers 18 is connected via a LAN (Local Area Network) 22 to a wireless transceiver/router 24. The transceiver/router 24 will normally be located in proximity to the server 18; however, it is possible for the server 18 to be located offsite from an airport, so long as the transceiver/router 24 is located at or near the airport, within communication range of aircraft 10 on the ground. The transceiver/router 24 forms a communication network or link 26 that includes wireless routers 14 onboard the aircraft 10. The wireless routers 14 are commercially available devices such as "secureLINK" available from Avionica, Inc., in Miami, Fla. SecureLINK enables secure, wireless transfer of data to and from the aircraft 10, and functions to establish an authenticated and encrypted log-on to a ground-based wireless communication network automatically when the aircraft 10 enters the range of the ground-based network. SecureLINK provides connectivity to Ethernet enabled devices onboard the aircraft 10, such as the cockpit devices 12a-12n which require periodic update of files stored therein. Currently, secureLINK uses IEEE 802.11b ("Wi-Fi") to achieve relative high data transfer rates.

In the illustrated embodiment, the onboard wireless router 14 detects when the aircraft 10 is within range of the transceiver/router 24, and functions to establish a secure, encrypted communication link 26 between the devices 12 and the FBO server 18. Files transmitted from the server 18 via transceiver/router 24 and communication link 26 are directed by router 14 to the appropriate cockpit devices 12 that are authorized to receive information updates. When the communication link 26 is established, the onboard router 14 sends information to the server 18 via the LAN 22 which includes the serial number or other identification number of the cockpit device 12 and for each data subscription, the item number, cycle number and expiration date of the data currently resident in the identified device 12. It should be noted here that the last four mentioned parameters will not be sent to server 18 via the LAN 22 if the cockpit device 12 is newly enrolled for one or more subscriptions that do not yet reside in it. In other words, the new subscriptions data need to be obtained from service provider server 16. This information is sent normally only once each time the aircraft 10 establishes the communication link 26 at a particular FBO server 18 site.

In response to receipt of information related to each particular cockpit device 12, the FBO server 18 communicates with the service provider server 16 to determine the active data subscriptions owned by the serial number of the device 12. The IP address of the server 18 is also sent to the service provider server 16. If the FBO server IP address and serial number of the device are found to be correct, then the service provider server 16 downloads to the FBO server 18 the subscriptions owned by the particular device 12 that has been authenticated. The information sent from the service provider server 16 to the FBO server 18 will, for each data subscription available for download to a device 12, include the item number, cycle number, expiration date and the data file name for charts, NAV data, weather or NOTAMs. It should be noted here that the FBO server 18 will, at this point, already have stored data files, so that the files transfer from the server 16 include only those data files that are new, i.e. a new subscription for a particular item number, or which replace an expired file version in the cockpit device 12. At this point in time, the FBO server 18 will push, in an orderly fashion to the cockpit device 12, each of the required subscription data files. The FBO server 18 stores the item number, cycle number and expiration date of all data downloaded to the cockpit devices 12. Further, the FBO server 18 maintains a record of the item numbers that were downloaded to the devices 12 to aid in billing and invoicing as well as the payment of commissions, in those cases where the service provider pays the FBO a fee or commission for acting as a distributor of the subscription updates.

Figure 3:
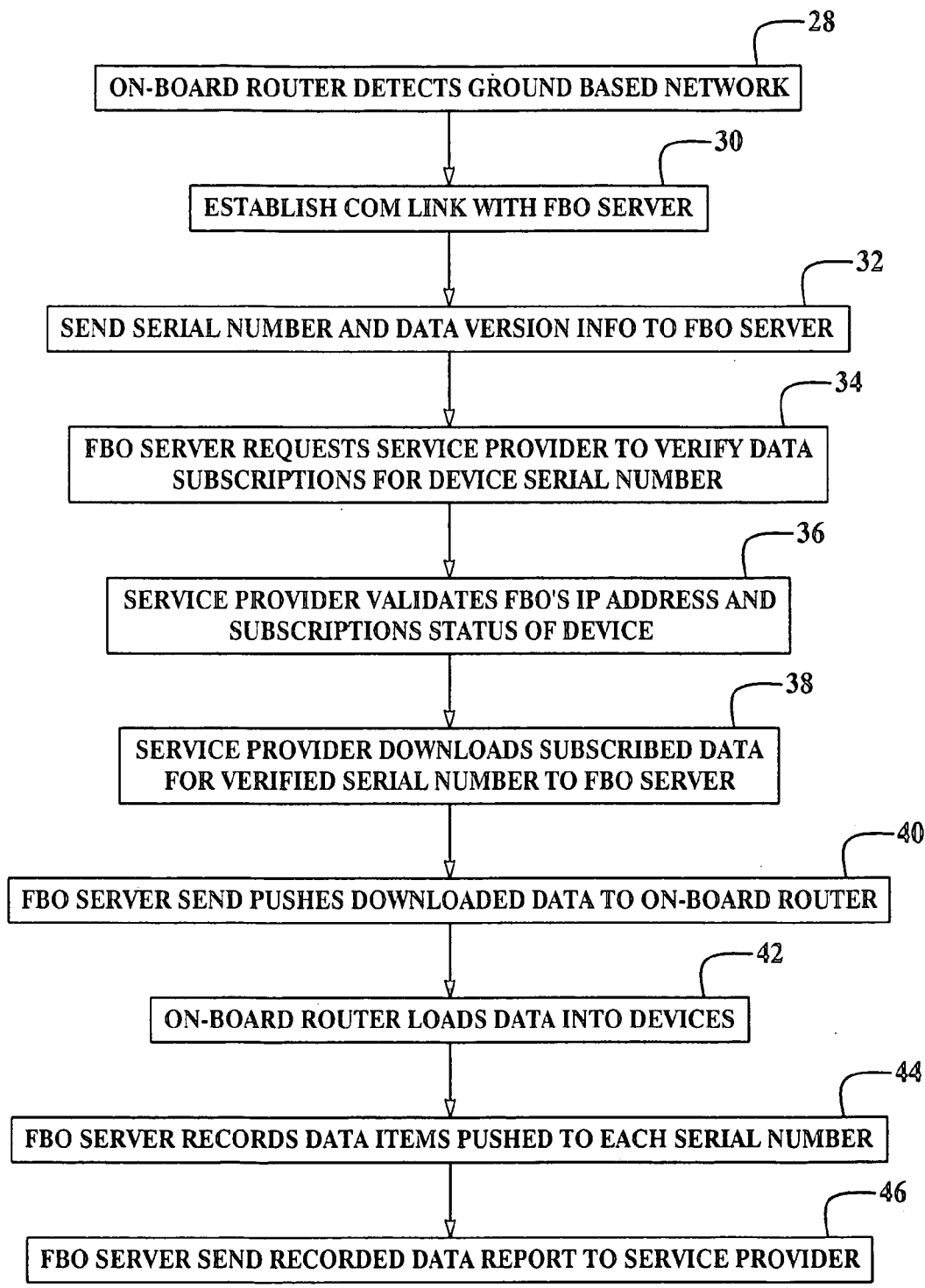
FIG. 3 is a flow diagram showing the basic steps used by the system of the present invention to automatically deliver the updates.

Reference is now also made to FIG. 3 which depicts the basic steps of a method for automatically delivering and installing file updates to the cockpit devices 12. Beginning at 28, the aircraft 10 and particularly the onboard router 14 enters an area on the ground within a predetermined distance of the wireless transceiver/router 24. Then, at 30, the onboard router 14 establishes the communication link 26 with the FBO server 18 via the transceiver/router 24 and LAN 22. The communication link 26 having been established, the router 14 then sends the serial number and data version information to the FBO server 18 as shown at step 32. At step 34, the FBO server 18 requests the service provider server 16 to verify data subscription for the particular device serial number.

At step 36, if the service provider server 16 validates the FBO's IP address and the subscription status of the particular cockpit device 12, then the process proceeds to step 38, where the service provider server 16 downloads to the FBO's server 18 the subscribed data files for the verified device serial number. At step 40 the FBO server 18 pushes the downloaded data or stored file data through the communication link 26 to the onboard router 12. At step 42, the onboard router 12 loads the data received from server 18 into the appropriate cockpit device 12. The FBO server 18 then records, at step 44, data items pushed to each device serial number. Finally, at step 46, the FBO server 18 sends a data report to the service provider server 16 which includes the item numbers that were pushed from the server 18 to each of the cockpit devices 12.

The present invention may also be used in circumstances where aircraft 10 is not equipped with the on-board router 14. Referring now to FIG. 1 again, information update files downloaded from the service provider server 16 to the FBO server 18 can be made available to pilots using a pilot-accessible interface such as a ground-based kiosk 48 located at an airport. The kiosk 48 is essentially a data terminal provided with appropriate hardware and a software application for reading and writing data on a portable media 50 such as a flash memory card, USB memory key or compact flash, for example. The information written onto the pilot's media 50 at the kiosk 48 will typically include the item number, cycle number and expiration data of currently stored data. File updates are downloaded from the service provider server 16 to the FBO server 18, which in turn transfers the appropriate data file to the kiosk 48 which is then written onto the pilot's media 50.

When the pilot inserts his media 50 into the kiosk 48, the kiosk 48 reads the information on media 50 and communicates this information to FBO server 18. When the media 50 is inserted in the kiosk 48, the application resident in the kiosk will first request the pilot to login. The login ID and password will be verified by service provider server 16 via the FBO server 18. If the pilot is a valid customer of the service provider, then his subscriptions information will be displayed in the kiosk. At this time, the application running in the kiosk can check the item no., cycle no., and expiration date in the pilot's media and verify if this information exactly matches any one of the subscriptions the pilot has per the data received from the service provider server 16 via the FBO server 18 and displayed in the kiosk 48. If a match is found, then the media 50 could be re-used to burn the same item no., if indeed the existing data in the media is out-of-date. Otherwise, the pilot will choose the appropriate coverage i.e. item no. of choice for burning to the media 50 inserted in the kiosk 48. If the pilot does not have a login, i.e. he is not an existing customer of service provider, then the kiosk application must allow the pilot to purchase any coverage (as a default, all coverages i.e. items nos. for the country where the FBO is located will be available for purchase via the kiosk 48. However, the pilot can buy any applicable coverages for another country also) of choice. The kiosk application will enable the pilot to pay via his credit card the charge for the purchase and burning of the coverage onto the media 50. Credit card payment information passed by the software application running in kiosk 48 via FBO server 18 will be processed by service provider 16, which in turn may pay a commission to the FBO for acting as a distributor.

The FBO server 18 maintains a record of the item numbers downloaded by the pilots, and this information is periodically uploaded to the service provider server 16 which is then used for periodically billing and invoicing the pilot, i.e. customer as well as for payment of commissions to the FBO. The use of the kiosk 48 obviates the need for the pilot to communicate with the FBO server 18 or the service provider 16 using a laptop or other specialized device.

Although this invention has been described with respect to certain exemplary embodiments, it is to be understood that the specific embodiments are for purposes of illustration and not limitation, as other variations will occur to those of skill in the art.

What is claimed is:

1. A method of automatically delivering electronic file updates used in cockpit devices onboard aircraft, comprising:
   storing electronic file updates at a central location under control of a software update service provider, said central location at a site different from a software update distribution site and the file updates including navigational charts, NavData files, weather, notices to airmen (NOTAMs), or combinations thereof;
   downloading the electronic file updates to each of a plurality of said distribution sites;
   storing the electronic file updates at the distribution sites;
   providing information at the distribution sites that identifies the cockpit devices on-board aircraft in landing areas respectively associated with the distribution sites, said information provided to said central location to verify a subscription for update service for a respective device, and verifying that a cockpit device is authorized to receive installation of a file update;
   reading the stored file updates and determining whether a version of a stored file update is later than a version of a file update previously installed in one of the cockpit devices;
   transferring the read file updates to the cockpit devices using a wireless network over a secure communications link following verification of said subscription, maintaining an electronic record of the read file updates, and periodically transmitting the electronic record to the central location;
   detecting when an aircraft comes within a predetermined distance of a ground-based wireless transmitter connected to a network in communication with a server comprised by the distribution site and establishing the secure communications link between the aircraft and the server, the detection including receiving a radio signal on-board the aircraft that originates from the wireless transmitter; and,
   detecting the aircraft, establishing the secure communications link, verifying the subscription, reading the stored file, and transferring the read file updates being performed without human intervention.

2. The method of claim 1, wherein maintaining the electronic record of the read file updates and periodically transmitting the electronic record to the central location are performed without human intervention.

3. The method of claim 1, wherein verifying that the cockpit device is authorized to receive installation of the file update comprises:
   storing a set of identification numbers uniquely identifying each of a plurality of cockpit devices;
   reading an identification number carried by the cockpit device on-board the detected aircraft; and
   determining if the identification number that has been read is present in the stored set of identification numbers.

4. The method of claim 1, wherein downloading the file updates to the distribution sites is performed using the internet.

5. The method of claim 1, wherein the secure communications link is established in part by a wireless router on-board the aircraft connected to the cockpit devices.

6. The method of claim 1, wherein the step of maintaining an electronic record includes recording the version of the file update that was read, and a serial number of the cockpit device into which the file update was to be installed.

7. A method comprising:

an onboard wireless router of an aircraft entering an area on the ground within a predetermined distance of a wireless transceiver/router connected to a local area network (LAN), a fixed base operator (FBO) server also being connected to the LAN;

detecting when the aircraft comes within the predetermined distance and establishing a secure communication link between the onboard router and the FBO server via the transceiver/router and the LAN, the detection including receiving a radio signal onboard the aircraft that originates from the wireless transceiver/router;

the FBO server receiving a serial number and data version information of a cockpit device of the aircraft from the onboard router;

the FBO server requesting a service provider server to verify a data subscription for the cockpit device serial number;

the FBO server receiving a validation of an IP address of the FBO server and a subscription status of the cockpit device from a server of the service provider;

the FBO server receiving downloaded subscribed data files for the verified cockpit device serial number from the service provider server, the data files including navigational charts, NavData files, weather, notices to airmen (NOTAMs), or combinations thereof;

the FBO server pushing the downloaded data files or stored data files through the communication link to the onboard router;

the FBO server recording item numbers of the data files pushed to the cockpit device;

the FBO server sending a data report to the service provider server including item numbers of data files that were pushed from the FBO server to the cockpit device; and detecting the aircraft, establishing the secure communication link, requesting subscription verification, and pushing the downloaded data files or stored data files are performed without human intervention.

8. The method of claim 7, wherein sending the data report is performed without human intervention.

9. The method of claim 7, wherein downloading the subscribed data files is performed using the internet.

\* \* \* \* \*